United States Patent [19]
Prieur et al.

[11] 3,751,603
[45] Aug. 7, 1973

[54] DEVICE FOR CONTROLLING MAGNETIC HEAD DISPLACEMENT

[75] Inventors: Lucien Robert Prieur, Ecouen; Hubert Cecyl Albert Rousseau, Meudon, both of France

[73] Assignee: Societe Industrielle Honeywell Bull (Societe anonyme), Paris, France

[22] Filed: Jan. 24, 1972

[21] Appl. No.: 219,956

[30] Foreign Application Priority Data
Feb. 5, 1971 France ............................. 7103902

[52] U.S. Cl. ................. 179/100.2 CA, 340/174.1 C
[51] Int. Cl. ............................................. G11b 5/54
[58] Field of Search ............... 340/174.1 E, 174.1 F, 340/174.1 C; 179/100.2 CA

[56] References Cited
UNITED STATES PATENTS

| | | | |
|---|---|---|---|
| 3,263,512 | 8/1966 | Hanoley | 340/174.1 C |
| 3,531,788 | 9/1970 | Brown et al. | 340/174.1 C |
| 3,370,131 | 2/1968 | Reed | 179/100.2 CA |
| 3,445,116 | 5/1969 | Knox | 179/100.2 CA |
| 3,477,725 | 11/1969 | Housman | 179/100.2 CA |
| 3,532,833 | 10/1970 | Suzuki | 179/100.2 CA |
| 3,651,501 | 3/1972 | Cote | 179/100.2 CA |

*Primary Examiner*—Vincent P. Canney
*Attorney*—Ronald T. Reiling et al.

[57] ABSTRACT

A device for controlling at least one magnetic head in an apparatus for writing and reading data on and out a magnetic medium.

Said device is equipped with a spindle actuating at least one cam cooperating with at least one arm equipped with a spring attached by one of its ends to this arm and by the other end in contact with the magnetic head in such a way as to be capable of bringing said magnetic head near said medium into a position for writing or reading said data, a device for controlling the rotation of said spindle, means for locking the magnetic head in said position and means for releasing the magnetic head, so that it may be moved away from said medium.

Said device is utilizable with magnetic disk memories.

9 Claims, 13 Drawing Figures

PATENTED AUG 7 1973

3,751,603

SHEET 1 OF 6

DEVICE FOR CONTROLLING MAGNETIC HEAD DISPLACEMENT

The present invention concerns a device for controlling magnetic head displacements towards a magnetic data medium. It is more specifically oriented towards use with magnetic disk memories.

In modern disk memories entering data onto or retrieving data from disks is carried out by means of magnetic heads which fly several microns above the disks thus avoiding wear and damage to the disk surfaces. The most recent developments in disk memories aim at increasing the data recording density of the disks, which reduces the width of the recording tracks and, as a result, the corresponding length of the read head gaps, as well as the thickness of the magnetic coating of each disk surface. This makes the positioning of the magnetic heads with respect to the disks and their spacing with respect to the disk surfaces of more and more critical importance. It has therefore become essential to produce precise, stable, reliable and safe positioning devices.

Devices are known which fulfill these conditions partially. On one such device, each head is located at the end of an actuator arm which is an integral part of a movable carriage, this arm being loaded by a spring blade which forces the head down towards the disk surface and cooperates with a fixed ramp so that head separation only occurs when the heads have left the area of the disk surface. There is a danger of damage to disks when using this device. Furthermore, this device cannot be used to position fixed read/write heads.

Another known device uses heads attached to one end of a rocker arm while the other end cooperates with a cam that is an integral part of a spindle. This device has the following drawbacks : the actuator arm may oscillate when the heads are moved near the disk surfaces and, especially, when they are moved away from the disk surfaces, which may involve disk damage. In addition, in cases where each disk is serviced by a pair of read heads which must be symmetrical to each other with respect to the disk - and this is very frequent in actual practice - precise positioning of the heads is dependent on the relative position of the cam with respect to the disk.

The present invention will remedy these drawbacks and relates to a device for controlling magnetic head displacements towards a magnetic data medium. It is more specifically oriented towards magnetic disk memories with at least one magnetic head.

In the present invention, the device for controlling the displacement of one or more such heads towards the indicated medium is made up of a spindle driving at least one cam actuating an arm equipped with a spring one end of which is attached to this arm and the other in contact with the magnetic head to force the latter towards the data medium in a position to read or write said data, a device controlling the rotation of this spindle, a means of locking the magnetic head in the specified position and a means of freeing the magnetic head so that it can be moved away from said data medium.

The magnetic disk memory includes at least one disk with two magnetic-coated surfaces and one write and read head to service each disk surface. It also includes a mechanism for exerting equal forces on both heads when the heads are in the read or write position, this mechanism consisting of the said cam which is movable in relation to the spindle.

In addition, said arms are symmetrical with respect to the plane of symmetry of the disk, and their longitudinal axes are perpendicular to that of the spindle with each of the arm ends bearing via control levers against each of the surfaces of said cam at the periphery thereof and symmetrically with respect to its plane of symmetry.

A device according to the present invention may have the following characteristics :

Said cam is a flexible wheel with a rigid hub which remains stationary with respect to the spindle. The springs attached to said corresponding arms are preloaded springs which, when mounted on the arms, form double-stiffness elastic assemblies.

The device controlling spindle rotation would be an electromagnet integral with the disk memory base, the rotating armature of which may be actuated by the gear mechanism on one end of said arm.

Means for locking the magnetic head or heads in the read or write position comprise a magnetic wafer and a second cam integral with spindle ; the periphery of this cam includes an overlap which may come into contact by its edge with said wafer.

Means for releasing the magnetic head comprise a lever integral with a bar controlled by an electromagnet which may cooperate with a stud incorporated in the second cam, and a drawback-roller bearing against the edge of this cam.

Other characteristics and advantages of the present invention will become more apparent in the following description, by way of example of a preferred embodiment, with reference to the accompanying drawings, in which.

Figure 4A:
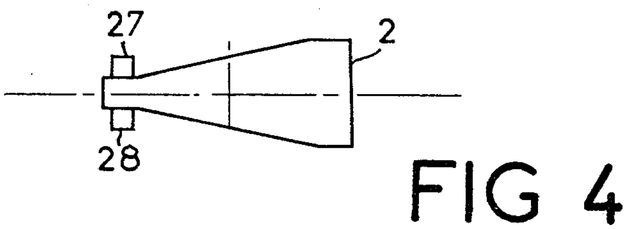
Figure 4B:
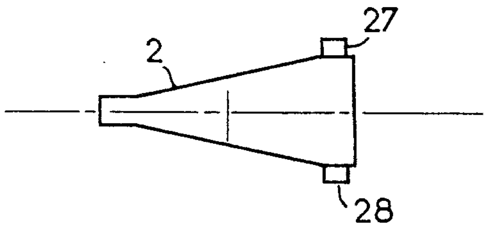

FIGS. 4 and 4*b* are side views of the same flexible cam

Figure 5:
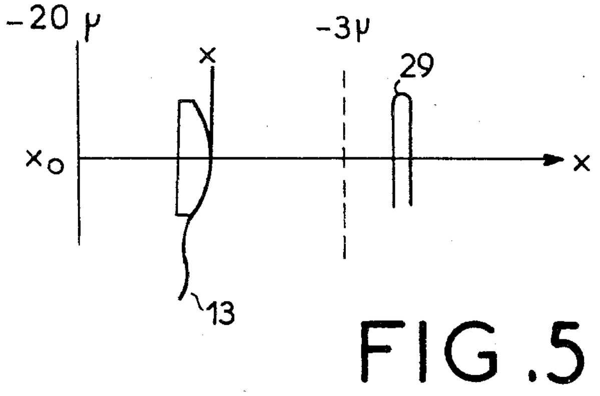
Figure 7:
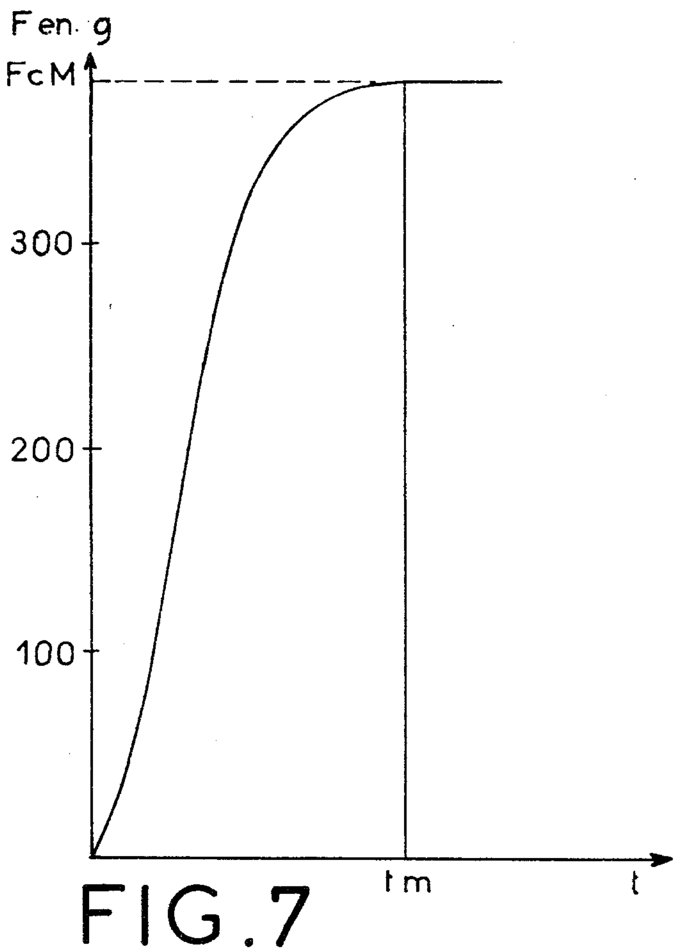
Figure 6:
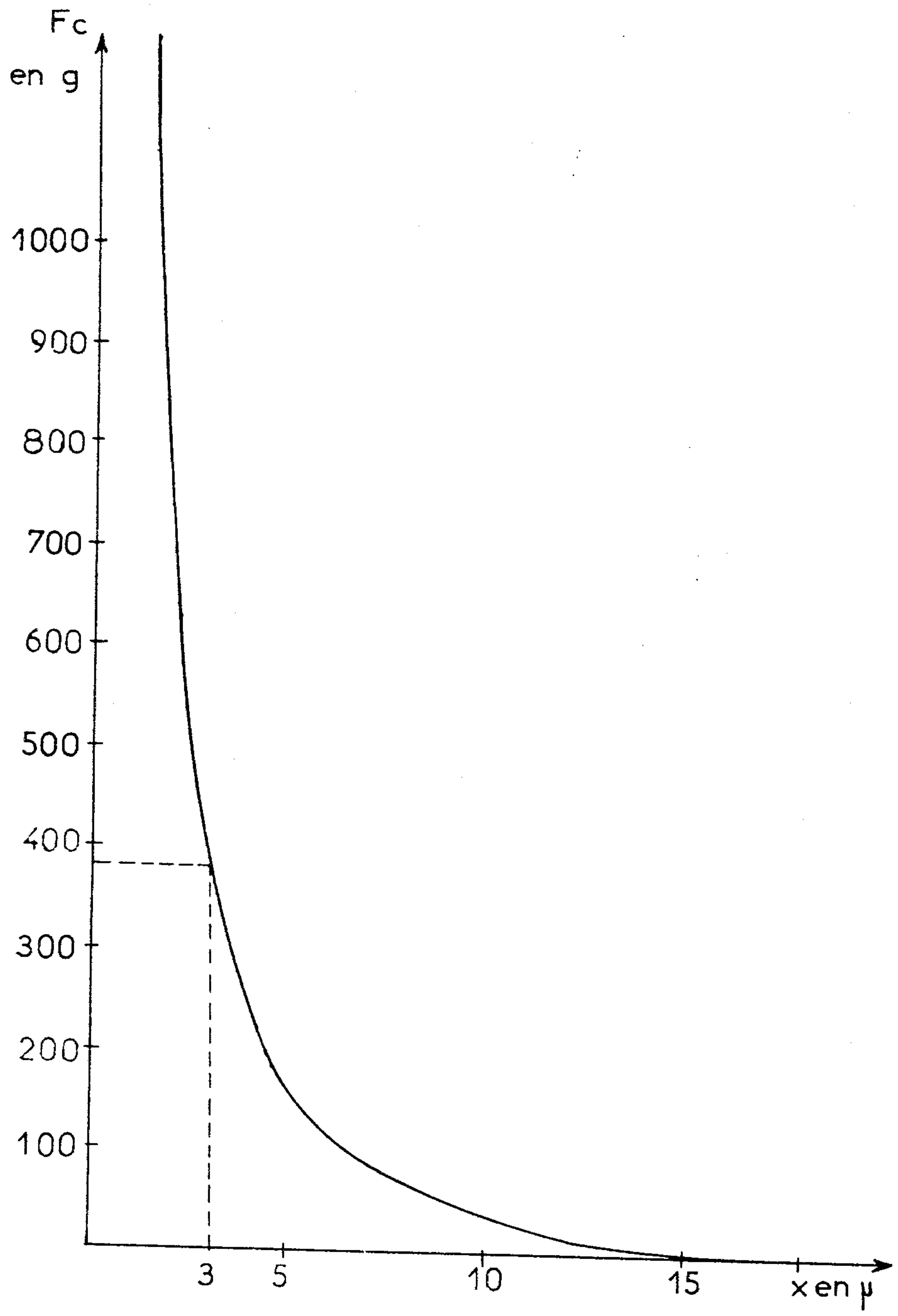
Figure 8A:
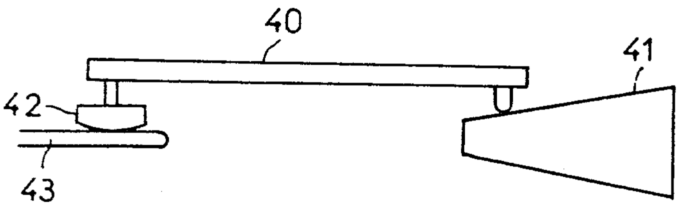
Figure 8B:
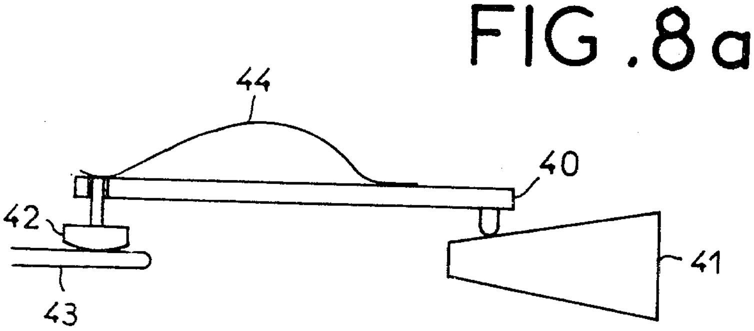

FIG. 5 shows the magnetic head and the disk after the air cushion has been formed FIG. 6 is a graph showing the force exerted by the air cushion against the head in relation to the head-to-disk distance FIG. 7 shows the loading force applied to the head, as a time function FIGS. 8*a* and 8*b* are very summary diagrams of a system which provides a law of force theoretically similar to that indicated in FIG. 7

Figure 9:
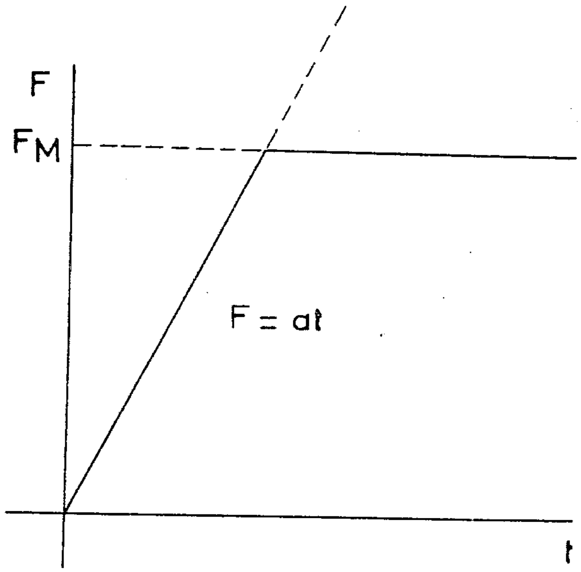

FIG. 9 is a graph showing the law of the effective force provided by the system shown in FIG. 8

Figure 10A:
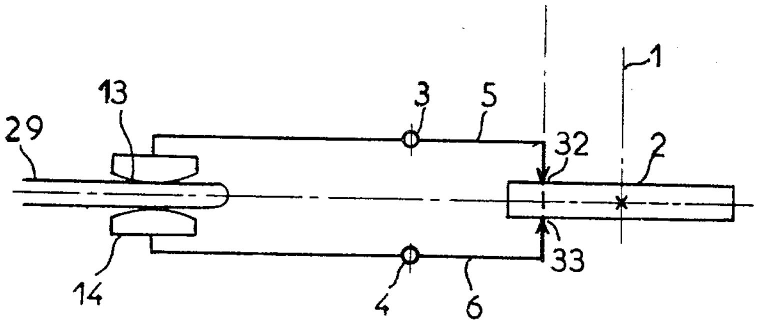
Figure 10B:
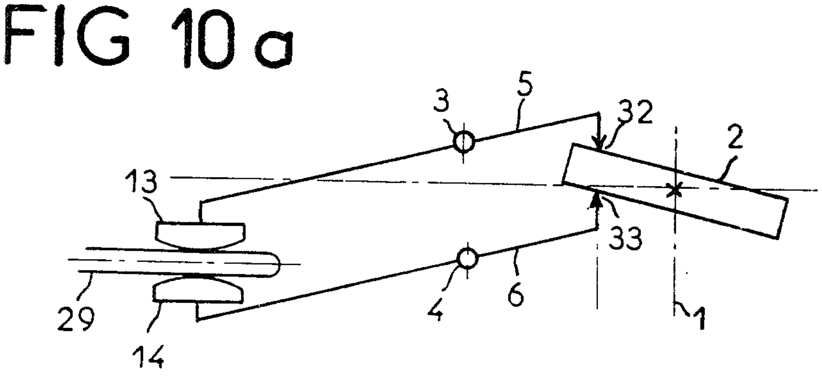

FIGS. 10a and 10b show two relative positions of the flexible cam and of the magnetic disk.

Figures 1, 2:
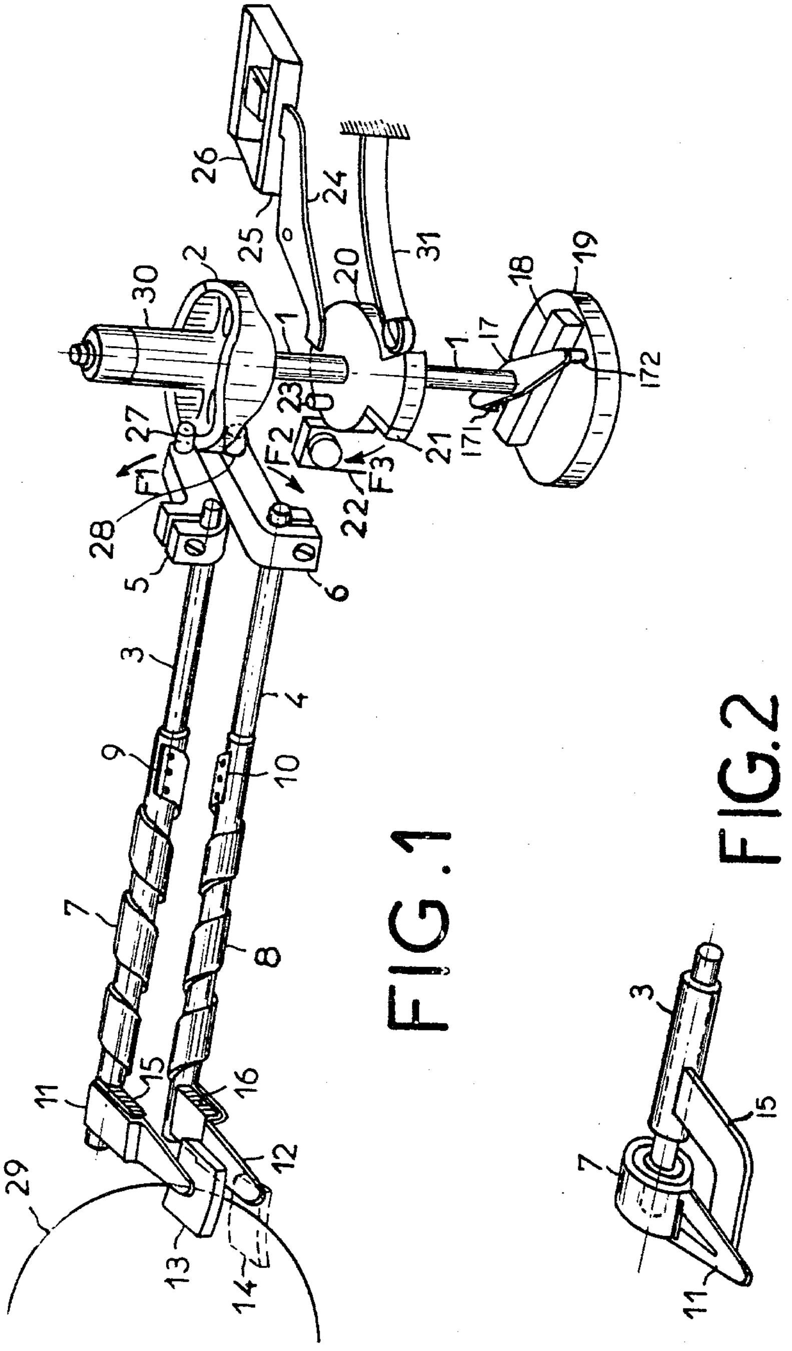
FIG. 1 shows the control device according to the invention
FIG. 2 shows another constructional form of this device

A control device constructed in accordance with the invention, as shown in FIG. 1, includes a spindle 1 which is an integral part of a cam 2 cooperating with arms 3 and 4 respectively through control levers 5 and 6. Preloaded springs 7 and 8 are coiled around arms 3 and 4 ; the ends 9 and 10 of these springs are attached to side arms and the other ends 11 and 12 are in contact with the magnetic heads 13 and 14. These heads are attached, in the usual manner, to a base which is not shown. Arms 3 and 4 also include stops 15 and 16 against which the ends 11 and 12 of springs 7 and 8 bear.

The longitudinal axes of arms 3 and 4 are perpendicular to the axis of the spindle 1. In relation to the plane of symmetry of disk 29, arm 3, spring 7 and head 13 are symmetrical to arm 4, spring 8 and head 14 respectively.

The device shown in FIG. 1 also includes gearing elements made up of a fork 17 located at the end of the spindle 1 and equipped, at each of its ends, with two studs 171 and 172 which can cooperate with the rotating armature 18 of an electromagnet 19 fixed on the disk memory base.

In addition, this device contains a second cam 20, integral with the spindle 1 and equipped with an overlap 21 which comes into contact by its edge with a magnetic wafer 22 which is not part of said spindle. This cam has a stud 23 on one of its surfaces which is intended to cooperate with lever 24 and comes into contact, by its edge, with a drawback-roller 31. Control lever 24 is integral with a bar 25 which is normally attracted by an electromagnet 26. Control lever 24, bar 25, electromagnet 26 and drawback-roller 31 are not part of spindle 1.

If the magnetic heads 13 and 14 are movable in relation to the disk, the device described above is integral with a carriage to which these heads are attached. If these heads are stationary, the device is integral with the base of the disk memory.

One variant of the device concerns arms 3 and 4 and is shown in FIG. 2. To simplify the explanation, only arm 3 is shown on this Figure. In this variant, the preloaded spring 7 is coiled around the end of arm 3. The end 11 of spring 7 bears against angular stop 15. In this variant, as in FIG. 1, arm 4 is symmetrical to arm 3, in relation to the plane of symmetry of disk 29.

Figure 3:
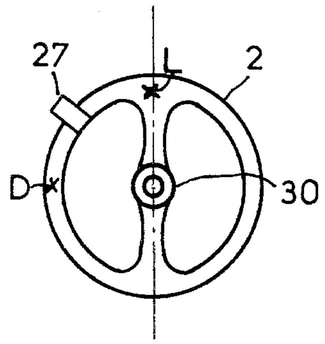
FIG. 3 is a top view of the flexible cam

According to a preferred embodiment, cam 2 is a flexible wheel (FIGS. 1, 3 and 4) with its rigid hub 30 remaining stationary in relation to spindle 1. This wheel is made of some elastic material such as nylon. The control levers 5 and 6 bear on each surface and at the periphery of this wheel in such a way as to be symmetrical in relation to its plane of symmetry via contactors 27 and 28 (FIGS. 1, 3 and 4). FIG. 4 shows a cross-section of wheel 2 along the LD quadrant of the circumference of this wheel.

This device operates as follows :

Assuming that the device is in the rest position : the electromagnet 19 is not supplied, studs 171 and 172 are located on either side of the rotating armature 18. Contactors 27 and 28 take up the position shown in FIG. **4*a* on cam 2. The magnetic heads 13 and 14** are about one mm away from the disk.

When the electromagnet 19 is supplied, armature 18 rotates a fraction of a revolution in the direction shown by the arrow F3, thus driving into rotation studs 171 and 172 and, through them, spindle 1 and cams 2 and 20. Contactors 27 and 28 then assume the position shown in FIG. **4*b* on cam 2 ; the control levers 5 and 6 rotate a fraction of a revolution each around the longitudinal axes of arms 3 and 4 in the direction indicated by arrows F1 and F2, which results in the fractional rotation of arms 3 and 4 around said axes. At the same time, ends 11 and 12 of springs 7 and 8 bear down on the magnetic heads 13 and 14 and in this way force them down towards the disks until their distance from the disks is equal to about three microns : heads 13 and 14** are then in the write and read position. A more detailed survey of the dynamics involved in the displacement of the head towards the disk will be given further on.

While these heads are being forced down towards the disk surface, stud 23 bears against control lever 24 and overlap 21 of cam 20 bears hard against magnetic wafer 22 to prevent any rotation of spindle 1 ; it then blocks heads 13 and 14 in the write and read position. At this point power supply to the electromagnet 19 is cut off and the armature 18 returns to its initial position.

To raise the magnetic heads, power supply to the electromagnet 26 is cut off ; bar 25 is released so that control lever 24 provides a strong enough pulse to stud 23 to force the overlap 21 to leave the magnetic wafer first and then cause spindle 1 to rotate in the direction opposite to the one indicated by arrow F3. This rotational movement is controlled by drawback-roller 31 until spindle 1 returns to its initial rest position : contactors 27 and 28 are then back in the position shown in FIG. **4*a* and heads 13 and 14** are moved away from tbe disk.

We shall now take up, in detail, the displacement of the heads 13 and 14 as they approach the disk ; to simplify the explanation, we will only discuss one of the heads, such as head 13. It is assumed, in the following description, that an air cushion forms when the head reaches a distance of about twenty microns from the disk surface : this displacement is broken down into two distinct phases :

1. Phase 1 : head displacement towards the disk outside the range of the area in which the air cushion is formed : contactor 27 travels along the outer edge of cam 2 and moves from the position shown in FIG. **4*a* to the position shown in FIG. 4*b* ; head 13 moves at a relatively high speed towards disk 29** until the air cushion is formed. Just before this air cushion is formed, the head enters an area in which its speed will be unstable, which may cause it to move in a disjointed manner. In order not to hinder its continued displacement, the head, on entering this area of unstable speed, must have gathered enough velocity to fly across this area rapidly. Suffice it to say, to give some idea of the required speed, that the head must move at a rate of about one-tenth of a meter per second.

2. Phase 2 : the air cushion is formed : it has a high and variable rigidity and therefore affords a very rigid force with a stiff front to oppose the progress of head 13. An increasing force must therefore be applied quickly to the head to balance the force of the cushion, otherwise the head will bounce back : this would create an oscillating movement which could cause the head to touch against the disk surface repeatedly and in this way deteriorate it. For phase 2 only, an ideal force formula must therefore be found so that the velocity of head 13 movement breaks down at a distance of three microns from the disk.

To do so, we will take the plane of disk 29 as the origin of the abscissas X. The X-axis is perpendicular to this plane and the abscissas, measured in microns, are negative in relation to this plane, as can be seen on FIG. 5. Velocity V, accelerations and forces are positive towards the disk.

Let X0 be the abscissa from which the air cushion will be formed. It will be remembered that this distance is about 20 microns. Let V0 be the velocity gathered by head 13. The equation governing head displacement will then be written :

$$dx/dt = -k\ (x+3) \quad (1)$$

where $k = (-vo)/(xo+3)$, $xo = -20$ and $vo = 10^3/T$ (in $\mu$ per ms) where T is the head-to-disk approach time during phase 1.

From this equation 1, we derive the equation for the desired force (for a given value of $vo$).

By deriving equation 1, we obtain :

$$d^2 x\ /dt^2 = -k\ dx/dt \ (11) \text{ (in } \mu \text{ per ms}^2) ;$$

head 13 is subjectedto the following three forces :

1. Fr : applied positive force,
2. Fc : negative force exerted by the air cushion : this force, which is a function of abscissa $x$, is shown in FIG. 6. When $x$ is equal to three microns, this force Fc takes on a value FcM of about 380 grams.
3. Ff : Friction force in the form $-k_1\ x\ v$ By referring to the fundamental equation of dynamics as applied to the head 13, we obtain :

$$m\ (d^2x)(dt^2) = Fr + Fc + Ff \quad (111)$$

where $m$ is the mass of the head.

The desired law of force is then written :

$$Fr = m\ (d^2x)/(dt^2) - Fc - Ff \quad (IV)$$

By using relation (11) and the graph shown in FIG. 6, the relation (1V) can be expressed numerically and the variations of time function $Fr(t)$ can be examined by varying the following parameters : mass $m$, velocity $vo$, shock absorption constant $k_1$. It will be noted that except close by the time $t = 0$, this function is virtually independent of the mass m and the shock absorption constant $k_1$. A representative sample graph of function $Fr(t)$ is given in FIG. 7. The maximum force, equal to $FcM$ is reached very quickly : the function $Fr(t)$ is almost linear, since the slope of the line representing this function increases as vo increases. In this way, for a velocity $vo$ equal to 0.1 meter per second, the maximum force FcM is reached within a time $t_M$ of under 2 milliseconds.

We will try to imagine any system enabling to obtain such a law of force : we will take a lever 40 (FIG. 8*a*), whose rigidity has been pre-determined, which has one end integral with a linear cross-sectioned cam 41 rotating at a constant speed and its other end integral with a pad 42.

Let us assume that at moment $t = 0$ the pad is in contact with the plane surface 43 : at the point of contact, two equal and opposite forces with an absolute value of $F$, expressed as $F = at$, will appear, where a is a constant depending more particularly on the rigidity of the lever (FIG. 9).

If lever 40 is forced into contact with pad 42 through the action of a preloaded spring 44 (FIG. 8*b*) whose rigidity is negligible as compared with that of the lever, force $F$ will not exceed the value $F_M$ of preloading, as indicated in FIG. 9.

Now let us assume that at moment $t = 0$ the pad is about 20 microns away from the plane surface and that an air cushion of the same type as described earlier is formed ; it can then be admitted that the forces to be applied to pad 42 will form an equation similar to the one shown in FIG. 9.

Calculation will show whether a system of this sort satisfies the requirements of $F(t)$ shown in FIG. 7, when the lever is suitably rigid : the association of arm 3 with spring 7 preloaded to a value equal to $F_{cM}$, which association cooperates with head 13 and linear sectioned cam 2, fulfills the conditions defined above.

We know that cam 2 is a flexible nylon wheel with a rigid hub 30 which remains stationary in relation to spindle 1.

The following explanation will make the choice of a cam of this sort more understandable :

For obvious reasons, writing and reading data on both surfaces of the disk must be done in a perfectly identical manner : the two heads 13 and 14 must therefore be constantly at a distance of 3 microns from the two surfaces of the disk, regardless of any imperfections in the surface of the disk itself (condition of the disk surface, buckle, etc).

Let us assume that at a given moment the plane of symmetry of disk 29 and cam 2 are the same, as shown in FIG. 10*a*. In this figure, the longitudinal axes of arms 3 and 4 are perpendicular to the plane of the figure and cam 2 and the levers 5 and 6 are merely sketched in.

Both heads 13 and 14 are then perfectly equidistant from both surfaces of the disk, as equal forces are exerted on each of them.

If, as shown in FIG. 10*b*, the planes of symmetry are no longer the same, heads 13 and 14 will not be equidistant from the two surfaces of the disk and as a result the forces applied to these heads will only be equal if the points 32 and 33 at which levers 5 and 6 come into contact with cam 2 are made parallel to the axis of spindle 1 ; this condition is fulfilled by the flexible cam 2.

It is evident that the use of a rigid cam could only provide the same result if the cam were capable of sliding on spindle 1. It is obvious that the use of any system that would exert equal forces on heads 13 and 14 is possible without departing from the scope of the present invention.

We claim:

1. In apparatus for reading and writing data on a magnetic medium equipped with at least one magnetic head, a device for controlling the displacement of a head toward the medium, comprising; a rotatable spindle having a wheel mounted thereon having surfaces forming a cam, an arm extending perpendicular to the axis of said spindle, means interconnecting one end of the arm with the magnetic head for movement of the head into, and out of, the read-write position adjacent the medium through rotation of said arm, about its longitudinal means interconnecting the opposite end of said arm with said cam for rotating said arm about said axis, by movement of said cam, spring means attached between said arm and said magnetic head for biasing said head towards a surface of the medium, means for controlling rotation of said spindle means for locking the spindle in position and to thereby lock the magnetic head in the read-write position, and means for releasing the magnetic head by releasing the magnetic head by releasing the spindle from the locked position.

2. The apparatus of claim 1 wherein the medium is a magnetic disk having two magnetized surfaces and a second magnetic head, said apparatus further including a second arm extending perpendicular to the axis of said spindle, means interconnecting one end of said second arm with said second magnetic head for movement of the head into and out of the read-write position adjacent the medium through rotation of said arm about its longitudinal axis, means interconnecting the opposite end of said second arm with said cam for rotating said arm about said axis by movement of said cam, and second spring means attached between said second arm and said magnetic head for biasing said head towards a surface of the medium.

3. The apparatus of claim 1 wherein said spring means is a preloaded spring which combines with said arm to form an elastic and dual-stiffness assembly.

4. The apparatus of claim 1 wherein said wheel surfaces forming said cam comprise first and second spaced apart and opposed surfaces contacting said cam interconnecting means of said respective first and second arms, symmetrically with relation to the plane of symmetry of said wheel.

5. The apparatus of claim 1 wherein said wheel is connected to a rigid hub which remains stationary in relation to said spindle and said wheel is of flexible material whereby said cam surfaces are movable in relation to said spindle.

6. The apparatus of claim 2 wherein each of said spring means is a preloaded spring which combines with its respective arm to form an elastic and dual stiffness assembly.

7. The apparatus of claim 4 wherein said wheel is connected to a rigid hub which remains stationary in relation to said spindle and said wheel is of flexible material whereby said cam surfaces are movable in relation to said spindle.

8. The apparatus of claim 1 wherein the means for controlling rotation of said spindle includes gearing means disposed at one end of said spindle and an electromagnet disposed at adjacent said gearing means having an armature effective to actuate said gearing means when said electromagnet is energized.

9. The apparatus of claim 1 wherein the means for locking said spindle includes a magnetic wafer, a second cam attached to said spindle and, an overlap portion extending from said cam and in rotatable alignment with said wafer whereby rotation of said spindle causes said overlap portion to contact said wafer.

* * * * *

UNITED STATES PATENT OFFICE
CERTIFICATE OF CORRECTION

Patent No. 3,751,603 Dated August 7, 1973

Inventor(s) Lucien Robert Prieur, Hubert Cecyl Albert Rousseau

It is certified that error appears in the above-identified patent and that said Letters Patent are hereby corrected as shown below:

In Claims, Column 7, line 15, delete "1" and insert -- 2 --.

In Claims, Column 8, line 14, delete "at".

Signed and sealed this 25th day of December 1973.

(SEAL)
Attest:

EDWARD M.FLETCHER,JR.
Attesting Officer

RENE D. TEGTMEYER
Acting Commissioner of Patents